NON-EQUILIBRIUM CASTING SEGREGATE

NICKEL-BASE SUPER ALLOY MATRIX

NON-EQUILIBRIUM CASTING SEGREGATE

INCIPIENTLY MELTED EUTECTIC PORTION 3,748,107
SUPERALLOY EUTECTIC BRAZE
Lemuel A. Tarshis, Latham, and James L. Walker, Schenectady, N.Y., and Thomas F. Berry, Greenhills, Ohio, assignors to General Electric Company
Continuation-in-part of application Ser. No. 97,915, Dec. 14, 1970, now Patent No. 3,696,500, dated Oct. 10, 1972. This application May 25, 1971, Ser. No. 146,695
Int. Cl. B32b 15/00; C22c 19/00
U.S. Cl. 29—194     3 Claims

ABSTRACT OF THE DISCLOSURE

A method of forming an integral joint bonding together superalloy pieces, particularly of nickel-base superalloys, and improved brazing alloy composition therefor. The process includes steps to determine the composition of an incipiently melted and therefore lowest melting portion of the non-equilibrium casting segregate of a superalloy piece to be bonded, which includes incipiently melting the segregate before the analysis determination. The prepared brazing material contains no melting point depressants foreign to the composition of the superalloy piece to be bonded. The pieces to be joined together are heated with the novel brazing material therebetween. Subsequent progressive heat treatment diffuses and solutionizes the brazing material into the adjoining alloy pieces to homogenize the bond and make the joint zone an integral part of the joined members in microstructure and mechanical properties.

This application is a continuation-in-part of our co-pending application Ser. No. 97,915, filed Dec. 14, 1970, now U.S. Pat. 3,696,500, dated Oct. 10, 1972 and assigned to the same assignee as the present invention.

This application relates to the bonding of superalloys. More particularly, it relates to a method of bonding such alloys to make a substantially integral joint, and to specific brazing alloy compositions for bonding of nickel-base superalloys.

BACKGROUND OF THE INVENTION

Development of improved power producing apparatus, for example turbo machinery such as jet engines, has created a need for improvement of joints between two bonded superalloy members forming part of such machinery. In an ideal joint, the joining material would be integral with the component parts so that the juncture between the parts would be identical thereto metallographically as well as in physical and mechanical properties. Heretofore, particularly in nickel-base superalloy pieces such as René 100, it has not been possible to achieve or even approach such ideal bonding with an intermediate bonding material.

One known method of joining metal components together is by applying pressure to plastically deform the joint surfaces in an attempt to achieve perfect mating in atomic dimensions across the interface between the components. In this known process, referred to as "diffusion bonding," pressure is applied to obtain the necessary intimate contact in an attempt to eliminate gaps or voids, and heat is applied to promote the necessary diffusion between the superalloy components being joined. However, the pressures necessary in this diffusion bonding process to plastically deform the contacting surfaces places a severe limitation on the geometry of the components which can be joined in this manner and restricts them to only simple shapes, and to materials capable of withstanding such pressures as required by this diffusion bonding process. Since turbine blades for jet engines have complicated geometries, in such parts the joining of surfaces which do not mate perfectly has lead to attempts to fill the voids between the surfaces with a flowable plastic or liquifiable brazing material in order to obtain metal-to-metal contact.

In conventional brazing techniques, a low melting brazing alloy is utilized which is totally different from the components being joined, in composition, in metallographic structure and in properties.

Another bonding process, known as "activated diffusion bonding," is described in co-pending application Ser. No. 841,093, of George S. Hoppin III et al., filed July 11, 1969 and assigned to the assignee of the present invention. In the process of "activated diffusion bonding," since the superalloy of the parts to be joined melts at too high a temperature to use the same composition as a braze material, a joining composition is prepared which is basically identical to that of the supperalloy but which also contains melting point depressants such as boron, silicon, manganese, columbium, tantalum, and their mixtures. However, although specific alloy compositions useful for such activated diffusion bonding having satisfactory metallurgical and mechanical properties, the presence of melting point depressants which are foreign to and non-compatible with the composition of the components being joined can also introduce undesirable properties, such as embrittlement, introduced by the non-compatible phases in the microstructure of the brazing alloy.

In our above-mentioned parent co-pending application, Ser. No. 97,915, filed Dec. 14, 1970, the generic concept of a superalloy segregate braze is disclosed, which involves a process for determining a specific composition for a bonding material which is compatible with the superalloy pieces being joined and which corresponds to the composition of a non-equilibrium casting segregate of the superalloy pieces to be joined. This "low melting segregate," it was explained, is more easily located microscopically in nickel-base as-cast alloys containing a greater proportion of titanium plus aluminum, such as the René 100 alloy as compared to alloys containing lesser amounts of aluminum plus titanium such as René 80. For alloys such as René 80 which contain small quantities of the non-equilibrium casting segregate, the method disclosed in application Ser. No. 97,915 therefore provided for a step of heating the alloy to a temperature sufficient to incipiently melt the segregate for ease of location and identification thereof, but insufficient to melt the remainder of the alloy, and then cooled. This procedure makes clearly visible microscopically the segregate island regions of interest.

We have now determined, surprisingly, that these segregate regions or islands are in themselves chemically segregated. These "non-equilibrium cast segregate regions" form due to the non-equilibrium conditions which exist during normal cooling of the casting from molten condition. By heating this normally cast alloy with its inherent non-equilibrium casting segregate regions to a temperature at which portions of the segregate regions incipiently melt; these incipiently melted portions, forming upon cooling as islands within the cast segregate regions, are then the true lowest melting eutectic composition. The incipiently melted portion is different in composition, in metallographic structure and in properties from the remainder of the non-equilibrium casting segregate region which has not incipiently melted. For brazing purposes, a brazing material should be compatible and have a low melting point. Accordingly, a desirable brazing material, according to the invention, is prepared corresponding to the chemical composition of the incipiently melted lowest melting region.

SUMMARY OF THE INVENTION

It is therefore an object of the present invention to provide an improved method and bonding material for forming between superalloy members substantially integral joints wherein the material is compatible with but has a lower melting point than the superalloy pieces on either side of the joined surfaces.

Another object of the invention is to provide an improved bonding material and method for determining a specific composition for such material which has a lower melting temperature than adjoining segregate regions and which is free from non-compatible or foreign constituents or phases in sufficient quantity to introduce undesirable properties into the bond. Still another object of the invention is to provide an improved bonding composition for use in bonding superalloys.

Still another object of the invention is to provide an improved method for producing a brazed bond for nickel-base superalloys which bond will be integral with and substantially equal in metallographic structure and properties to the adjacent joined alloy parts.

In accordance with these and other objects of the invention, one feature of the method includes the steps of melting and casting a specimen corresponding to at least one of the superalloy pieces to be bonded together, incipiently melting the non-equilibrium cast segregate islands and subsequently examining the microstructure of the specimen of cast superalloy for the melted regions. The incipient melting causes the lowest melting eutectic segregate regions to form as islands within the remainder of the non-equilibrium casting segregate regions. The chemical analysis of this incipiently melted segregate region is then determined, and a brazing alloy composition is prepared corresponding to the determined analysis of the incipiently melted region. The material so prepared is formed into a disc or powder in accordance with standard brazing technology, and the brazing material is applied to the parts to be joined. The parts and joint are heated together at a temperature at which the prepared braze alloy will melt but at which the superalloy components being joined remain solid.

As a further feature of the invention, the joined components, together with the joint of braze alloy material bonded thereto are progressively heat treated in order to place the components of the braze alloy into solid solution in the adjoining superalloy to produce a bonded joint substantially integral with and substantially indistinguishable from the adjoining superalloy both in microstructure and properties.

These and other objects and advantages of the invention will be more fully understood and appreciated from the following detailed description and examples which are intended to be typical of, though not limiting, on the scope of the present invention.

The term "eutectic" is customarily defined as an alloy having its components in such proportion that its melting point is the lowest possible for those components. The term "eutectic alloy" is also often used to describe the characteristic microstructure resulting from the solidification of a metal of eutectic composition. In multiple component alloy systems, more than one eutectic composition may occur.

Accordingly, as used herein, to avoid confusion, the term "eutectic" refers to a composition or region which has a lower melting point than neighboring compositions or regions.

Table I lists the nominal compositions of known nickel-base superalloys where the method of the present invention may be used.

TABLE I.—NICKEL BASE SUPERALLOYS

| Element | Weight percent | | |
|---|---|---|---|
| | René 80 | René 100 | Mar M-200 |
| Nickel | Bal. | Bal. | Bal. |
| Chromium | 14.0 | 9.5 | 9.0 |
| Cobalt | 9.5 | 15.0 | 10.0 |
| Titanium | 5.0 | 4.20 | 2.0 |
| Aluminum | 3.0 | 5.50 | 5.0 |
| Tungsten | 4.0 | | 12.5 |
| Zirconium | 0.03 | .06 | 0.05 |
| Molybdenum | 4.0 | 3.00 | |
| Boron | 0.015 | .015 | 0.015 |
| Silicon | 0.2 | .50 | |
| Carbon | 0.17 | 0.18 | 0.15 |
| Manganese | 0.2 | 0.50 | |
| Iron | 0.2 | ¹ 1.0 | ¹ 1.5 |
| Vanadium | | 1.0 | |

¹ Max.

Figure 1:
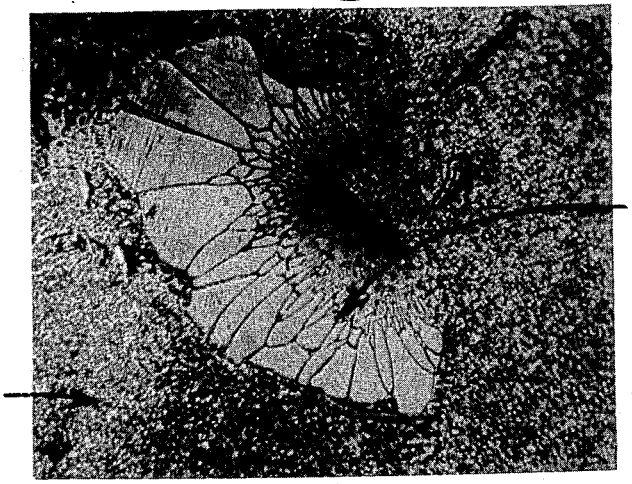
FIG. 1 is a photomicrograph (1000×) of a known nickel-base superalloy, René 100, in as-cast condition, showing an island of non-equilibrium casting segregate.

In FIG. 1, there is shown a photomicrograph (1000×) of a specimen of a known multi-element nickel-base superalloy, René 100, in as-cast condition. The last part of the molten alloy to freeze referred to herein as "non-equilibrium casting segregate" region, may be seen against the matrix background, and results from normal casting segregation.

This non-equilibrium casting segregate region, which contains the last part of the alloy to freeze upon solidification from molten condition, surprisingly, is not homogeneous, nor is its average composition the eutectic composition which has the lowest melting point. After reheating the alloy of FIG. 1 with its segregate region, a portion of this region begins to melt at 2175° F. This incipiently melted portion is the true lowest melting, i.e. "eutectic" composition, forming within the segregate region, as is visible in FIG. 2.

Figure 2:
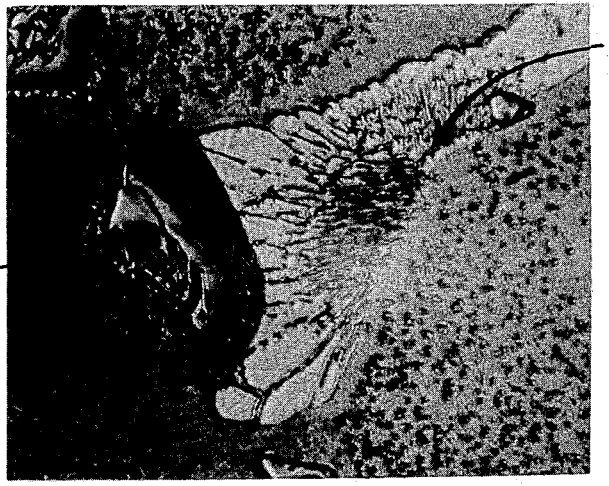
FIG. 2 is a photomicrograph (1000×) of the same alloy as in FIG. 1, showing a corresponding segregate which has been partially incipiently melted at 1220° C. (2228° F.)

Chemical analysis by microprobe showed that the incipiently melted region had a different composition from the balance of the segregate region of FIG. 2 and from the casting segregate region of FIG. 1.

Example I

In order to prepare a brazing alloy suitable in particular for joining components of René 100 alloy, the following steps were taken. A specimen of René 100 nickel-base superalloy corresponding to the composition of two pieces to be joined was cast. The cast specimen was heated for 5 minutes at 2228° F. to incipiently melt a portion of the segregated regions. The segregated areas, including the incipiently melted regions, were then examined microscopically and analyzed with an electron microbeam probe analyzer. The results of these analyses are listed below in Table II.

TABLE II.—COMPOSITIONS OF NON-EQUILIBRIUM CASTING SEGREGATE REGION AND INCIPIENTLY MELTED EUTECTIC REGION IN RENÉ 100

| Element | Weight percent | |
|---|---|---|
| | Non-eq. casting segregate region | Incipiently melted eutectic |
| Nickel | Balance | (¹) |
| Chromium | 3.1 | 7.5±3.0 |
| Cobalt | 10.6±0.5 | 13.5±3.0 |
| Titanium | 7.6±0.2 | 2.6±1.0 |
| Aluminum | 5.2±0.3 | 1.4±0.8 |
| Zirconium | 0.3±0.1 | 15.1±7.0 |
| Molybdenum | 1.0±0.3 | 2.8±2.0 |
| Vanadium | 0.5±0.1 | 0.4±0.2 |

¹ Balance (51.278+5.0).

The wide scatter in the composition of the incipiently melted eutectic region listed in Table II is due to the non-homogeneous nature of the specified regions analyzed, and also due to the presence of these elements present as carbides not in the solid solution. The values listed are therefore averages for the listed elements at various points within the indicated regions.

Example II

Specimens of alloys falling within the ranges of composition defined in Table II were cast and prepared for potential use as brazing alloys. The compositions used are listed in Table III below. Cooling curves were obtained for both these alloys. The segregate alloy was found to melt at 2375° F., while the incipient melt alloy melted at 2175° F. This data is consistent with the observation that the segregate region was unmelted during the incipient melting performed in Example I. The segregate alloy melts at too high a temperature to be considered for brazing. The most desirable temperature range, based on experience, for brazing nickel-base superalloys such as René 100 is 2150–2200° F. and thus the incipient melt alloy composition has an ideal melting point.

A braze alloy material having a composition corresponding to that of the incipiently melted eutectic alloy listed in Table III was prepared in the form of a disc 0.010″ thick and inserted between two pieces of René 100 superalloy to be joined. The two pieces of superalloy and the inserted braze material were then heated uniformly together at a temperature at which the prepared braze alloy melted, but below the melting temperature of the superalloy. The braze alloy melted and diffused into the adjoining superalloy to become substantially integral therewith.

The resulting bonded pieces can then be progressively solution heat treated in order to further diffuse the braze material into the joining pieces until the braze composition becomes a more integral part of the adjoining alloy, preferably in solid solution.

TABLE III

| Element | Weight percent | |
|---|---|---|
| | René 100 segregate alloy | René 100 incipient melt alloy |
| Nickel | Balance | Balance |
| Chromium | 3.1 | 7.5 |
| Cobalt | 10.6 | 13.5 |
| Titanium | 7.6 | 2.6 |
| Aluminum | 5.2 | 1.4 |
| Zirconium | 0.3 | 12.1 |
| Molybdenum | 1.0 | 2.8 |
| Vanadium | 0.5 | 0.4 |

It will be understood, of course, that, although the analysis of the incipiently melted region in the described Example I was made by microbeam probe, the composition analysis can also be determined by other known chemical analysis procedures.

Figure 3:
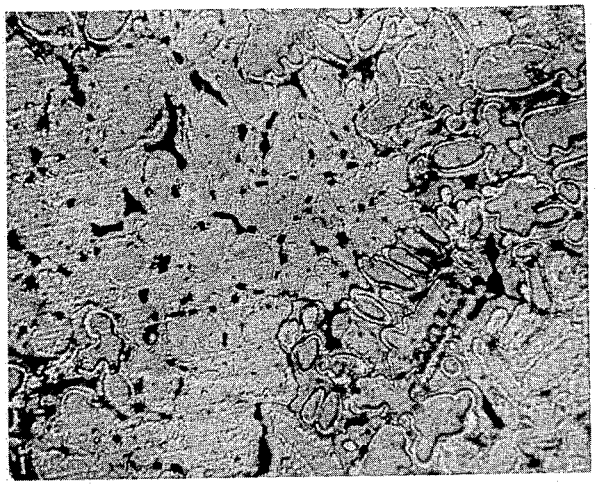
FIG. 3 is a photomicrograph (500×) showing the microstructure of an as-cast specimen of an alloy material composition corresponding to the analysis of the non-equilibrium casting segregate of FIG. 1.

FIG. 3 is a photomicrograph (500×) of the specimen in Example II of an alloy material composition corresponding to the left column of Table III, and corresponding approximately to the normal cast segregate island of FIG. 1. As explained above, this alloy had too high a melting point to be suitable for an ideal brazing alloy for René 100 alloy.

Figure 4:
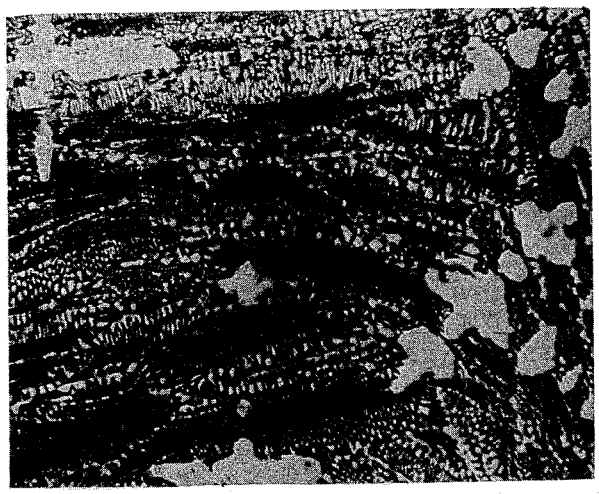
FIG. 4 is a photomicrograph (500×) of a brazing material composition corresponding to the incipiently melted eutectic region of FIG. 2.

FIG. 4 is a photomicrograph (500×) of a typical brazing material composition prepared according to the invention having the composition of the second column of Table III, and corresponding to approximately the analysis determined from the incipiently melted region of FIG. 2. It will be noted that this specimen has decidedly different microstructure from that of FIG. 3.

Table IV lists the approximate composition ranges suitable for brazing nickel-base alloys, based on the analysis and range of data of the incipiently melted eutectic of Table II.

TABLE IV

Approximate composition range for nickel-base brazing alloy

| Element: | Weight percent |
|---|---|
| Cobalt | 10.5 to 16.5. |
| Chromium | 4.5 to 10.5. |
| Aluminum | 0.6 to 2.2. |
| Titanium | 1.6 to 3.6. |
| Zirconium | 8.1 to 22.1. |
| Molybdenum | 0.8 to 4.0. |
| Vanadium | Trace to 0.6. |
| Nickel | Balance. |

Thus it has been shown, surprisingly and contrary to expectation, that the non-equilibrium casting segregate found in cast nickel-base superalloys is in itself segregated. By incipiently melting portions of this segregate it is possible to determine the lowest melting i.e. "eutectic," composition in such nickel-base alloys. Preparation of a brazing alloy composition corresponding to the analysis of this incipiently melted eutectic zone then yields a brazing material which has a lower melting point than areas which will surround it and which is compatible with and solutionable in the adjoining superalloy to make a homogeneous joint.

It will be obvious to those skilled in the art upon reading the foregoing disclosure that many modifications and alterations in the method steps and in the specific compositions may be made within the general context of the invention, and that numerous modifications, alterations and additions may be made thereto within the true spirit and scope of the invention as set forth in the appended claims.

What we claim as new and desire to secure by Letters Patent of the United States is:

1. As an article of manufacture, a structure comprising a plurality of nickel-base superalloy bodies bonded together with a brazing alloy material consisting essentially in weight percent of about 4.5–10.5 percent chromium, 10.5–16.5 percent cobalt, 1.6–3.6 percent titanium, 0.6–2.2 percent aluminum, 8.1–22.1 percent zirconium, 0.8–4.8 percent molybdenum, and a trace to 0.6 percent vanadium, the balance being essentially nickel.

2. The article according to claim 1, wherein said material consists essentially in weight percent of about 51.3 percent nickel, 13.5 percent cobalt, 7.5 percent chromium, 1.4 percent aluminum, 2.6 percent titanium, 12.1 percent zirconium, 2.8 percent molybdenum, and 0.4 percent vanadium.

3. The article according to claim 1 wherein said material is characterized by having a melting point of about 2175° C.

References Cited

UNITED STATES PATENTS 3,450,512  6/1969  Maxwell _____ 29—194 X

L. DEWAYNE RUTLEDGE, Primary Examiner

E. L. WEISE, Assistant Examiner

U.S. Cl. X.R.

29—198; 75—171